United States Patent [19]

Kemper

[11] 4,238,976
[45] Dec. 16, 1980

[54] INFINITELY VARIABLE POWER TRANSMISSION AND SYSTEM

[75] Inventor: Yves J. Kemper, Birmingham, Mich.

[73] Assignee: Vadetec Corporation, Troy, Mich.

[21] Appl. No.: 952,790

[22] Filed: Oct. 19, 1978

[51] Int. Cl.³ .................................... F16H 37/06
[52] U.S. Cl. ........................... 74/682; 74/690
[58] Field of Search .......... 74/681, 682, 690, 687, 74/730

[56] References Cited

U.S. PATENT DOCUMENTS

| 3,897,697 | 8/1975 | Chambers et al. | 74/682 |
| 4,008,628 | 2/1977 | Orshansky, Jr. | 74/681 X |
| 4,152,946 | 5/1979 | Kemper | 74/193 |
| 4,168,637 | 9/1979 | Orshansky, Jr. | 74/687 |

FOREIGN PATENT DOCUMENTS 2533475  2/1976  Fed. Rep. of Germany.
2634244  2/1977  Fed. Rep. of Germany ............ 74/191

*Primary Examiner*—Philip C. Kannan
*Attorney, Agent, or Firm*—Robert F. Ziems

[57] ABSTRACT

An infinitely variable transmission and system in which power supplied to a system input is transmitted to a system output through at least two infinitely variable (I.V.) transmission units and an epicyclic gear train. The I.V. transmission units are independently adjustable and operable to assure an equal division of power transmitted through each unit over at least the range of systems operation where demand for maximum power is likely to occur in practice. As a result, rated power for each unit may be one-half rated full power for the system, while at the same time providing a wide range of system speed ratios.

12 Claims, 11 Drawing Figures

INFINITELY VARIABLE POWER TRANSMISSION AND SYSTEM

BACKGROUND OF THE INVENTION

This invention relates to mechanical power transmission systems and more particularly, it concerns a torque transmission system and method by which the torque path between system input and system output is split between at least two infinitely variable transmission units in a manner to optimize the efficiency of each such unit over a wide range of system torque loads and speeds ratios.

Mechanical power transmissions which transmit torque from an input to an output at infinitely variable speed ratios are well known in the art and generally referred to as "I.V. transmissions". Because the power generating efficiency of most engines or prime movers is highest in only a limited range of operating speeds, I.V. transmissions have and continue to generate much interest as a potentially ideal solution to the transmission of power from a power source to a power consuming load which must be driven at speeds varying from the operating speeds of the power source.

Mechanical I.V. transmissions are generally embodied in a structural organization capable of transmitting torque by friction between two or more traction surfaces on relatively rotatable bodies supported in such a manner as to enable the traction surfaces to be retained against one another under a normal force adequate to prevent slippage between the surfaces. The infinitely variable speed ratio is achieved by designing the torque arm or radius of one of the bodies to be continuously variable relative to the radius of the other body. The geometric configuration of two such bodies capable of attaining this result is exemplified by a wheel shiftable axially on a disc or a ring shiftable along the axis of a cone.

In a commonly assigned co-pending U.S. application Ser. No. 706,291, filed July 19, 1976, by Yves Jean Kemper, now U.S. Pat. No. 4,152,946 issued May 8, 1979, the present inventor, several embodiments of an I.V. transmission are disclosed in which torque is transmitted between a first body, represented by a pair of axially movable internal traction surfaces of revolution about a first axis, and a second body represented by a pair of external cone-like traction surfaces of revolution about a second axis inclined with respect to and intersecting the first axis at a point of axes intersection. The second body is supported rotatably on its own or second axis in a crank-like supporting body journalled for rotation about the first axis. Torque applied to the crank-like body results in nutational movement of the second axis about the first axis and rotation either of the second body about the second axis or of the first body about the first axis. In embodiments where the first body is held against rotation as a reaction member, the second body rotates about the second axis as a result of its frictional engagement with the traction surfaces on the first body at two points of engagement spaced equally and oppositely along the first axis from the point of axes intersection. A pinion gear coupled at one end of the second body orbits in planetary fashion about the first axis while in mesh with an orbiting idler engaged with a sun gear carried on an output shaft. The planet gear output in such a transmission offers flexibility in the transmission design by which a unidirectional constant velocity input may be transmitted as an output varying from zero to the approximate speed of the input in one direction; varying from zero to input velocity but in the opposite direction; or varying continuously from an intermediate output speed in the same direction as the input through zero to a directional reversal of the input.

While the state of the art relating to I.V. transmissions has been developed to a point of practical application in transmitting power of magnitude corresponding to that required by automotive vehicles and higher, the efficiency curve for an I.V. transmission, whether it be of the type disclosed in the afore-mentioned copending application or any of several other types, is the approximate reciprocal of the torque function of the power transmitted. At constant input power, therefore, transmission efficiency is highest with increased output speeds and lowest at low output speeds where torque multiplication is greatest. The need for improvement in an I.V. transmission system by which operating efficiencies can be improved while at the same time retaining the speed varying capabilities thereof will thus be appreciated by those skilled in the art.

SUMMARY OF THE INVENTION

In accordance with the present invention, a transmission system input is split between two or more independently adjustable I.V. transmission units and combined in a system output through a controlled epicyclic gear train operated in such a manner that I.V. unit efficiency is optimized in the transmission of system power over a wide range of system speed ratios. The I.V. units are preferably of a type in which unit output speed is a function of both traction surface radius ratio and unit gear ratio to maximize the range of system operation. In one embodiment, for example, both of the I.V. units may be provided with the same unit gear ratio and the unit outputs connected respectively to the sun and ring gears of a planetary gear train in which the planet carrier is connected to system output. In such an arrangement, three modes of system operation are effected. In one mode, the unit coupled to the ring gear of the planetary train is held against rotation so that the other unit will drive system output variably through the gear reduction afforded by the planetary unit. In a second range, both I.V. units are operative and independently adjusted to assure an equal division of transmitted power between the two units. In a third mode of operation, one of the two units is operated without adjustment at its highest output/input speed ratio whereas the other is adjusted to provide the variation in system output. As a result of this operation, system power is transmitted at low speeds and relatively high torque by one I.V. unit operating at high efficiency while system power transmitted over the major range of speeds and torques is split equally between the I.V. units.

Alternately, one of the two I.V. units is provided with a unit gear ratio by which the output of that unit may be varied in relation to system input both as to speed and direction. The other of the two units is designed with a gear ratio to maximize the range of speed ratios available at the other unit output for a given system input speed. By using as the epicyclic gear train, a differential in which rotation of a planet carrier is effected by rotation of two bevel gears of the same size, connecting the unit outputs to the bevel gears and system output to the planet carrier, unit operation may be alternated and combined to provide a system output having a wide range of speed ratios relative to system input including a directional reversal of system input. Moreover, the differential gearing unit may be used to provide a gear reduction factor of two merely by braking one of the two bevel gears coupled to the output of one of the I.V. units and transmitting system power through only the other of the units at increased unit efficiency. When both I.V. units are driving system output in the same direction, the variable ratio of each unit is adjusted to split equally the power transmitted by each unit as in the first-mentioned embodiment.

Among the objects of the present invention are, therefore: the provision of an improved infinitely variable transmission system in which system input is transmitted to system output by way of at least two infinitely variable transmission units; the provision of such a system in which rated power of each I.V. unit is a fraction of rated power of the system, the fraction approximating the reciprocal of the number of units used in the system; the provision of such a system which may be conveniently packaged; the provision of such a system in which the work performed by the respective infinitely variable units is equally divided; the provision of such a system in which the range of system speed ratio variation is increased over the range of speed ratio variation available in the units individually; and the provision of such a system in which the efficiency of the respective infinitely variable units is optimized.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENTS

Figure 1:
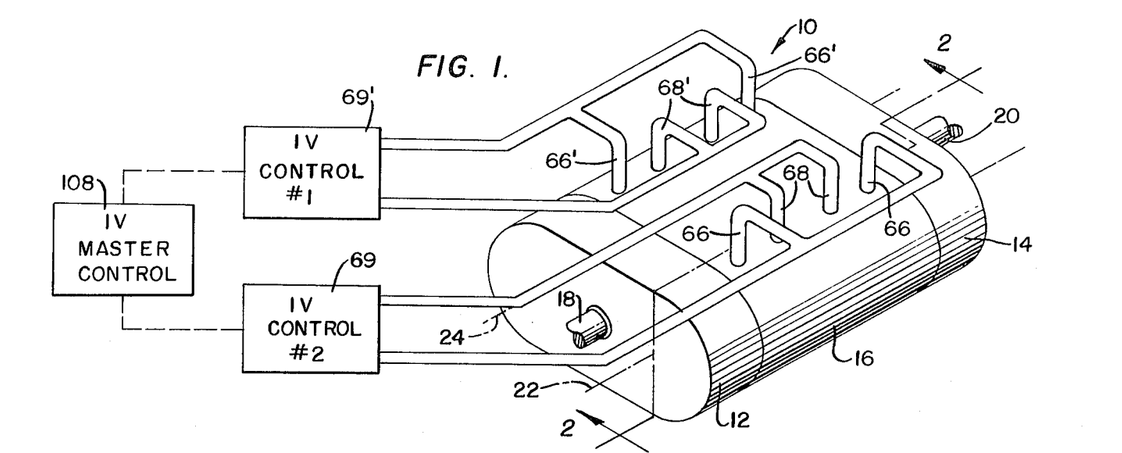
FIG. 1 is a partially schematic perspective view illustrating the exterior structure of the transmission system of the present invention.

In FIG. 1 of the drawings, the exterior structural organization of one embodiment of the invention is shown to include a housing 10 having a pair of end sections 12 and 14 joined to opposite ends of an intermediate section 16. A system input shaft is journalled centrally in the section 12 whereas a system output shaft extends rotatably from the center of the end section 14.

It will be seen from FIG. 1 that the exterior configuration of the housing 10 is such that the shafts 18 and 20 lie on a common longitudinal axis midway between a pair of parallel axes 22 and 24 generally concentric with semi-cylindrical sides of the housing. These axes 22 and 24 lie on the primary axes of two I.V. transmission units housed within the intermediate section 16 and designated hereinafter as IV#1 and IV#2.

Figure 2:
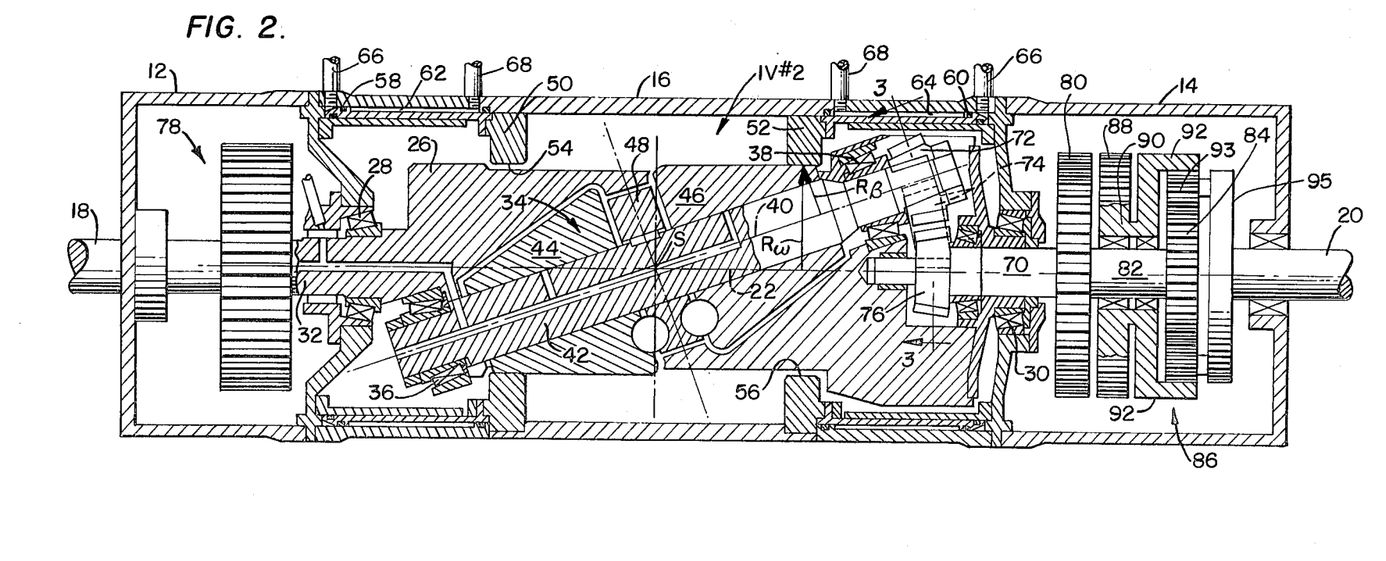
FIG. 2 is an enlarged fragmentary cross-section on line 2—2 of FIG. 1.

Because the functioning components of the two I.V. transmission units are alike, only the construction of IV#2 will be described with reference to the longitudinal cross-section shown in FIG. 2 of the drawings. Each of the transmission units includes a rotatable cranking body 26 journalled by bearings 28 and 30 in the frame or housing section 16 for rotation about the primary or first axis 22. A unit input shaft 32 is connected directly to the body 26 and is thus concentric with the axis 22. A nutatable body, generally designated by the reference numeral 34, is supported by bearings 36 and 38 in the cranking body 26 for rotation about a second axis 40 inclined with respect to and intersecting the first axis 22 at a point S of axes intersection. In the disclosed embodiment, the nutatable body 34 includes a central supporting shaft 42 on which a pair of oppositely convergent conical members 44 and 46 are supported for some measure of both axial and rotational movement relative to the shaft 42. A ball/ramp unit 48 is slidably keyed or splined on the shaft 42 between the cone members 44 and 46. While the unit 48 is fully disclosed in a commonly assigned co-pending application Ser. No. 926,823, filed July 21, 1978 by Harvey N. Pouliot, now abandoned to which reference may be made for structural detail, for a complete understanding of the present invention, it is necessary only to appreciate that the unit 48 functions to bias the cone members in opposite directions away from the point S in response to a torque differential between the shaft 42 and the cone members 44 and 46. It will be noted also that the conical surfaces of the members 44 and 46 are coaxial with the second axis 40 and are of a variable radius $R_b$ with respect to that axis.

The axial bias of the cone members 44 and 46 by the ball/ramp unit 48 along the shaft 42, coupled with the angular relationship of the axis 40 as well as the configuration of the conical members, causes the conical surfaces on the members 44 and 46 to be urged into engagement with a pair of axially adjustable rings 50 and 52 defining interior traction surfaces 54 and 56 which are of revolution about the primary axis 22 and of a constant radius $R_w$. The rings 50 and 52 are secured against rotation in the frame section 16 and are fixed at the inner ends of annular piston members 58 and 60 operably positioned respectively in annular chambers 62 and 64. The chambers 62 and 64 are ported to hydraulic fluid conduits 66 and 68 in such a manner that pressurized control fluid introduced to the chambers 62 and 64 through the conduits 66 and vented from the conduit 68 will cause the pistons and thus the rings 50 and 52 to move inwardly along the axis 22 toward the point S of axes intersection. Conversely, pressurized fluid introduced through the lines 68 accompanied by an exhausting fluid from the line 66 will cause the rings to move in the opposite direction. Although not shown in the drawings, it is also possible that the rings be mechanically connected in a manner to assure synchronized movement toward and away from the point S. Also, and as shown in FIG. 1 of the drawings, the conduits 66 and 68 extend to an I.V. control unit 69 which may be any of several well-known hydraulic control units and thus, it is shown only schematically in FIG. 1.

With reference again to FIG. 2 of the drawings, each of the transmission units IV#1 and IV#2 is provided with a unit output shaft 70 journalled for rotation in an end flange or spider separating the casing sections 16 and 14 of the system. Torque transfer to the unit output shaft in a manner to be described in more detail below, is from the nutatable body 34 by way of a pinion planet 72 keyed on the shaft 42, through a reversing idler 74 carried by the cranking body 26 and to a pinion gear 76 keyed on the shaft 70.

Although the operation of the I.V. unit to transmit torque from the unit input shaft to the unit output shaft is described in the afore-mentioned co-pending application Ser. No. 706,291, an appreciation of such an operation is important to a full understanding of the transmission system of the invention. Thus, power at the unit input shaft 32 will drive the cranking body in rotation about the primary axis 22, 22 carrying the body 34 in nutation about the same axis. As a result of the frictional engagement of the conical surfaces on the members 44 and 46 with the internal traction surfaces 54 and 56 on the rings 50 and 52, together with the coupling of the members 44 and 46 through the ramp unit 48 with the shaft 42, the shaft 42 will be rotated on the inclined axis 40. The rotational velocity and direction of the cranking body 26, the nutatable body 34 and the rings 50 and 52 are related by the general equation:

$$\overset{\circ}{\omega} - \overset{\circ}{\alpha} + (\overset{\circ}{\alpha} - \overset{\circ}{\beta})\rho = 0$$

In this equation, $\overset{\circ}{\alpha}$ is the speed at which the cranking member 26 is rotated about the axis 22; $\overset{\circ}{\beta}$ is the rotational speed of the nutating body 34 and thus of the shaft 42 about the axis 40; $\rho$ is the ratio of the radii of the external conical surfaces on the members 44 and 46 or $R_b$ to the radii on the traction surfaces 54 and 55 or $R_w$ ($\rho = R_b/R_w$); $\overset{\circ}{\omega}$ is the rotational speed of the rings 50 and 52 about the primary axis 22 which in the disclosed embodiment is zero because the rings 50 and 52 are fixed to the system housing. Because of this, the general equation above-given may be simplified to $$\overset{\circ}{\beta} - \overset{\circ}{\alpha}(1 - 1/\rho) = 0$$

Figure 3:
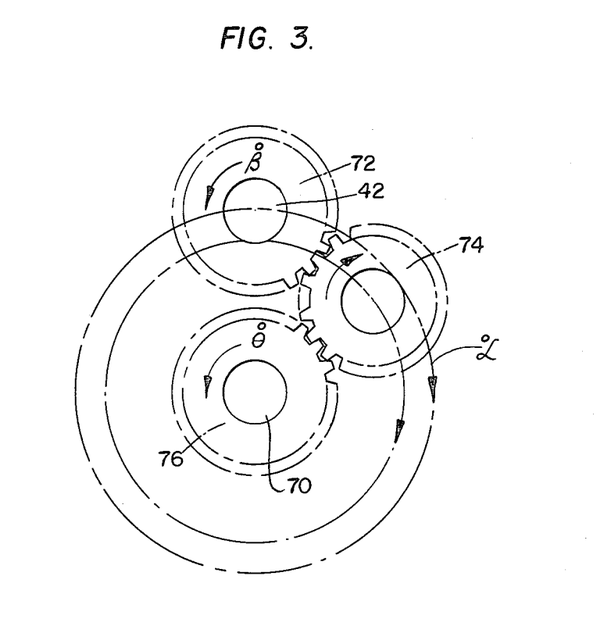
FIG. 3 is a schematic cross-section on line 3—3 of FIG. 2.

In FIG. 3 of the drawings, the gears 72, 74 and 76 are shown schematically with arrows depicting the relative directions of the velocity components $\overset{\circ}{\beta}$ and $\overset{\circ}{\alpha}$. Also, the rotation of the gear 76 coupled to the unit output shaft is represented by the function $\overset{\circ}{\theta}$. From FIG. 3, it will be seen that the gears in each of the I.V. units constitute epicyclic unit gearing in which the rotational velocity $\overset{\circ}{\theta}$ is a function of both $\overset{\circ}{\alpha}$ and $\overset{\circ}{\beta}$ as well as the respective radii of the gears 72 and 76. Specifically, if the radius of the gear 72 divided by the radius of the gear 76 is equal to the function k, then the velocity components $\overset{\circ}{\theta}$, $\overset{\circ}{\alpha}$ and $\overset{\circ}{\beta}$ are related by the equation:

$$k = (\overset{\circ}{\theta} - \overset{\circ}{\alpha}) \div (\overset{\circ}{\beta} - \overset{\circ}{\alpha}).$$

Because of the relationship of $\overset{\circ}{\beta}$, $\overset{\circ}{\alpha}$ and $\rho$ in the equation given previously, the speed and direction of rotation at the unit output shaft 70 is related to the speed and direction of rotation of the unit input shaft or $\overset{\circ}{\alpha}$ by the equation:

$$\overset{\circ}{\theta} = \overset{\circ}{\alpha}(1 - k/\rho).$$

Figure 3A:
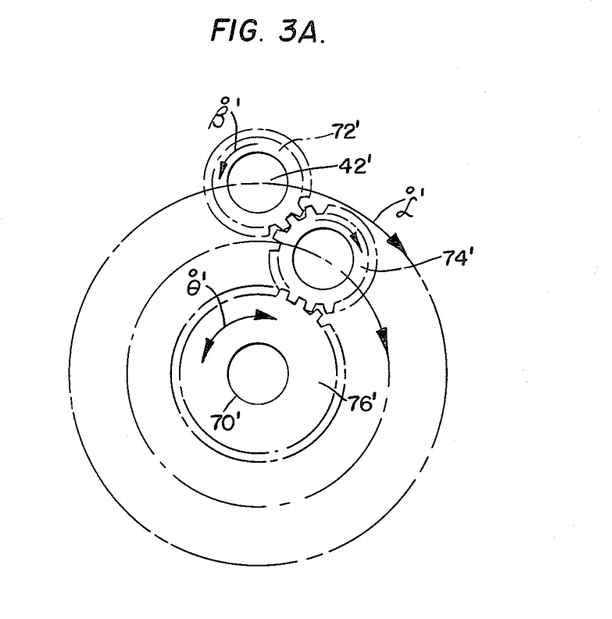
FIG. 3A is a view similar to FIG. 3 but showing a different gearing arrangement.
Figure 4:
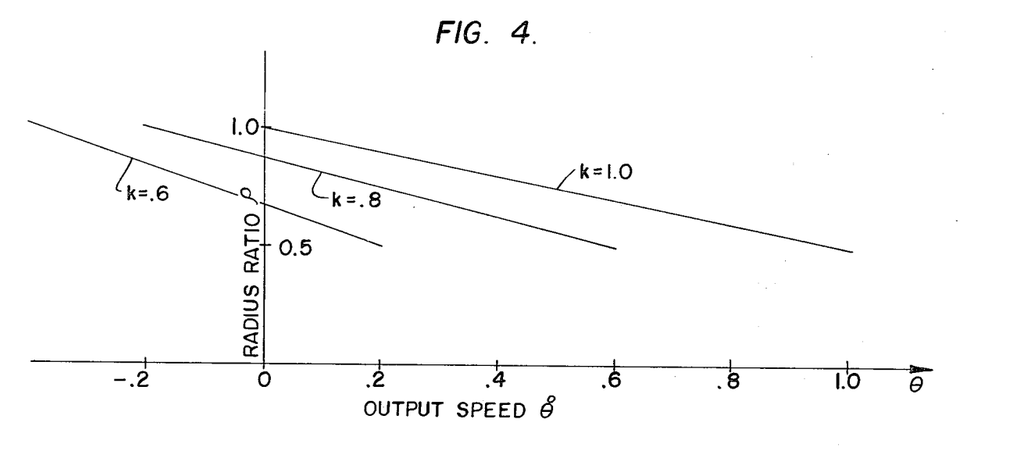
FIG. 4 is a graph with linear curves representing various unit gearing reduction factors in relation to transmission ratio changes and output speed.

The significance of the function k may be appreciated by reference to FIGS. 3A and 4 of the drawings. In FIG. 3A, the gears 72, 74 and 76 of FIG. 3 are replaced by 72', 74' and 76'. In this instance, the gear 72' is smaller than the gear 76' so that the function k is less than 1. In I.V. transmission units of the type illustrated in FIG. 2, moreover, the function $\rho$ may be considered variable between a minimum value on the order of 0.5 and a maximum value of approximately 1.0. As will be appreciated from FIG. 4, therefore, if the function $\rho$ is plotted against unit output speed $\overset{\circ}{\theta}$ expressed as a percentage of the input speed $\overset{\circ}{\alpha}$, the range of unit output speed $\overset{\circ}{\theta}$ for three values of k will be represented by the horizontal distance between the ends of the line, k=0.6, k=0.8 and k=1.0. Moreover, it will be noted that when k equals less than 1, the direction of the velocity $\overset{\circ}{\theta}$ may be reversed through zero relative to the direction of unit input shaft rotation merely by adjusting the function $\rho$ or by shifting the rings 50 and 52 toward and away from the point S of axes intersection in the embodiment described.

With reference again to FIG. 2 of the drawings, it will be noted that the end section 12 of the housing 10 encloses input gearing generally designated by the reference numberal 78 and by which the system input shaft 18 is drivably coupled with the respective unit input shafts 32. Although the complete organization of the gearing 78 is not visible in FIG. 2, its construction will be readily appreciated from the schematic drawing of FIG. 5 to be described hereinafter.

Similarly, the end section 14 of the housing 10 encloses output gearing by which the unit output shafts 70 of the respective transmission units IV#1 and IV#2 are connected to the system output shaft 20. In the particular embodiment illustrated in FIG. 2 (again incomplete because of the section illustrated in FIG. 2), the unit output of IV#2 is transmitted by gearing 80 to a shaft 82 keyed to a sun gear 84 of an epicyclic gear train 86. The output of IV#1 is transmitted by way of gearing 88 and a sleeve shaft 90 to a ring gear 92. Planet pinions 93 rotatably supported by a carrier 95 connect the gear train 86 to the system output shaft 20. The gear train 86 is therefore a form of epicyclic gearing having two inputs represented by the sun and ring gears 84 and 92 and an output represented by the planet carrier 95. Also, because the gears 84 and 92 are of different diameters, the gear reduction ratio of the unit 86 or K is less than 1. In the ensuing discussion, the reduction ratio K is assumed to be 0.6.

Figure 5:
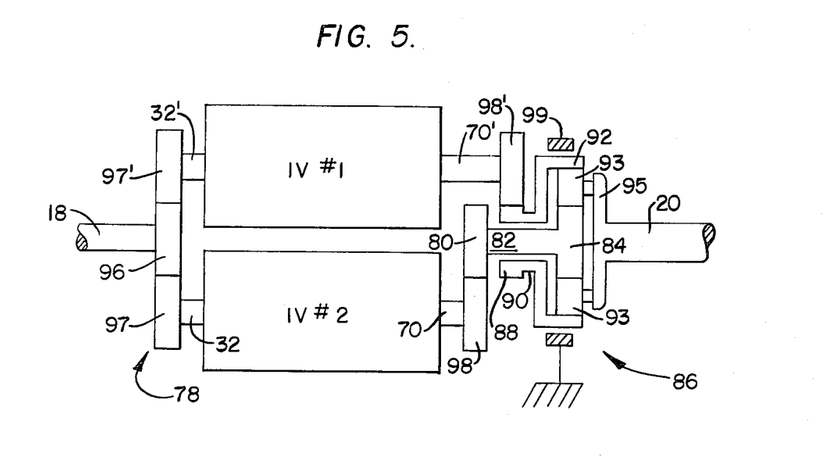
FIG. 5 is a schematic view representing one embodiment of the system of the invention.

A more complete understanding of the gearing housed within the end sections 12 and 14 of the housing 10 as well as the operation of the described embodiment may be had by reference to FIG. 5 of the drawings in which the system is schematically illustrated. In this figure, the I.V. transmission units are illustrated in block diagram style with corresponding parts designated by the same reference numeral but primed in IV#1. In this particular embodiment of the system, the unit gearing for the two units, that is, the gears 72, 74 and 76, will approximate the respective gearing discussed above with reference to FIG. 3. In other words, both of the units IV#1 and IV#2 in FIG. 5 are provided with unit gearing in which the function k approximates 1.0.

Also in FIG. 5, the input gearing 78 is more completely shown to be constituted by a pinion gear 96 in mesh with gears 97 and 97' which may be coupled directly to the respective input shafts 32 and 32' respectively because it is possible for each of the I.V. units to be regulated in a manner such that the output shaft 70, 70' thereof will not rotate relative to the input shaft 32, 32'.

Similarly, the unit output shafts 70 and 70' are coupled directly to pinion gears 98 and 98' which mesh respectively with the above-mentioned gears 80 and 88. As a result of this organization, it will be appreciated that the unit output shaft 70' is drivably coupled to the ring gear 90 in the gearing unit 86 and that the unit output shaft 70 is drivably coupled to the sun gear 84 of the epicyclic gear train 86. In addition, a brake 99 is schematically illustrated in FIG. 5 so that the drive train associated with the sun gear 92 may be held against rotation.

Figure 6:
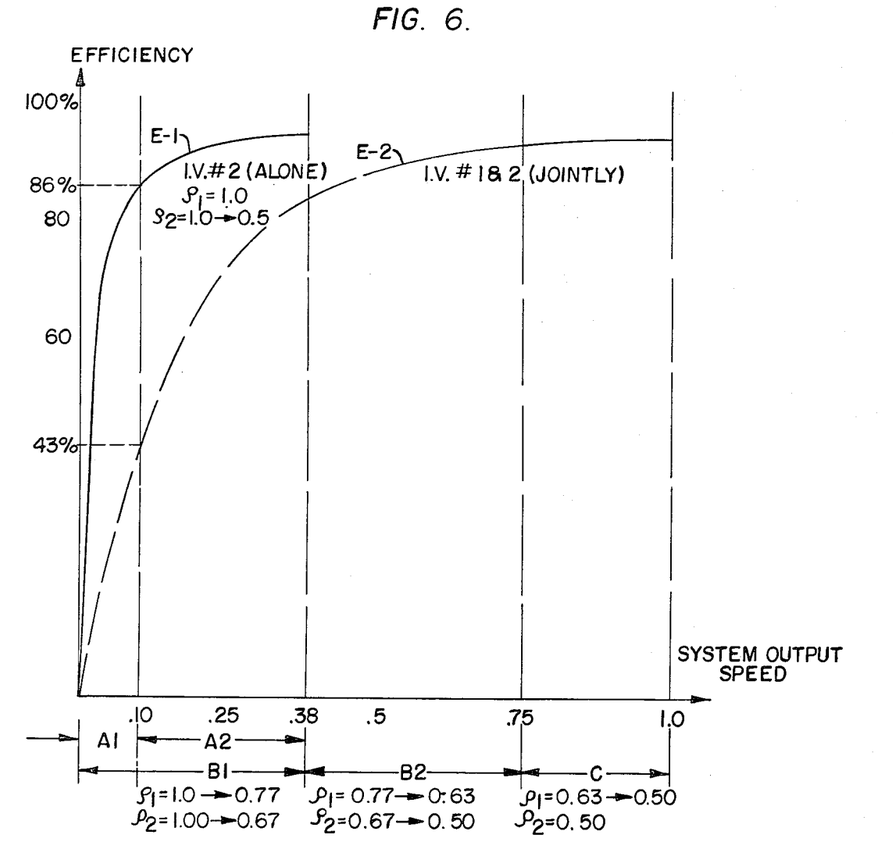
FIG. 6 is a diagram including efficiency curves for the transmission units of the embodiment illustrated in FIG. 5.

Operation of the system embodiment represented by FIGS. 1–3 and 5 may be most clearly understood by reference to FIG. 6 in which curves E-1 and E-2 represent I.V. unit efficiency versus system output speed, the latter being expressed as a ratio of system input speed variable through a ratio range of from zero to unity. Three modes or modes A, B and C of system operation are represented by variable ratio ranges of system output speed with modes A and B subdivided by modes A1, A2 and B1, B2, respectively.

In mode A, the system is operated with the brake 99 engaged to prevent the ring gear 92 from rotating and with IV#1 adjusted so that the output shaft 70' thereof will transmit no torque from the input shaft 32' (i.e., $\rho_1 = 1$). In mode A operation, thereofre, system output speed is a function of both the unit ratio of IV#2 $(1 - k/\rho_2)$ and of the reduction factor K of the epicyclic gearing 86 or $1/(1/K + 1)$. Thus, if $k_2 = 1$, as aforementioned and K = 0.6, system output speed for a constant system input speed will vary from 0 for $\rho_2 = 1$ to approximately 38 percent of system input speed. Because of the epicyclic gear reduction in this mode and the resulting reduced torque transmitting requirement of IV#2 for a given output power, the efficiency curve E-1 of IV#2 is steepened so that it reaches near maximum efficiency very quickly.

In mode B operation, the brake 99 is released and both transmission units, IV#1 and IV#2, operated so that the power transmitted from the system input shaft 18 to the system output shaft 20 is divided equally between the two I.V. units. This operation is achieved by varying $\rho_1$ and $\rho_2$ so that the function $K(1 - k_2/\rho_2)$ is approximately equal to the function $(1 - k_1/\rho_1)$. Specifically, in mode B operation, $\rho_1$ is varied from approximately 1 to 0.63 whereas $\rho_2$ is varied from 1.00 to 0.50 or the end limit at which the output/input ratio of IV#2 is maximum. The average efficiency of the two I.V. units operating jointly in mode B operation is reflected by the curve E-2 in FIG. 6 and is considerably lower for a given system power load at low speed operation than the curve E-1.

It will be noted from FIG. 6 that the line dividing modes A1 and A2 is selected to intersect the curves E-1 and E-2 at points where the percentage efficiency represented by the curve E-2 is approximately one-half that represented by the curve E-1. If it is assumed that the rated maximum power transmitting capacity of each of the I.V. units is one-half that of rated maximum power transmitting capacity for the system, it will be appreciated that a greater percentage of full system power can be accounted for in mode B operation, with both I.V. units splitting system power, than can be handled by one I.V. unit operating at less than twice the efficiency of either unit in mode B operation. In other words, full system output power is more nearly attained using the two I.V. units operating at an average efficiency of 45 percent, for example, than by using one I.V. unit operating at, say 80 percent because of the power transmitting capacity of each I.V. unit. For this reason, the system is controlled for operation through a relatively small range of system output speeds in mode A1 operation and then shifted to mode B operation at the point where the average efficiency of both I.V. units is more than one-half the efficiency of IV#2, alone. From FIG. 6, it will be seen also that mode B operation may continue through the substantial intermediate ratio range of the system.

As above indicated, mode B operation terminates when one of the I.V. units, specifically IV#2, reaches its maximum output/input speed ratio. The range of system operation is extended in a mode C during which IV#2 is retained at its maximum output/input ratio and IV#1 is adjusted further so that the function $\rho_1$ varies from 0.63 to 0.5, the maximum output/input ratio of IV#1. In mode C operation, power transmitted by the I.V. units will not be equally split with a result that IV#2 would be overworked; that is, IV#2 would be operated slightly in excess of its rated maximum power assuming an output demand for full system power. Because full system power is rarely required at maximum output speeds in actual practice, however, the potential for overworking one or the other of the I.V. units is of little or no adverse consequence in practice.

Figure 7:
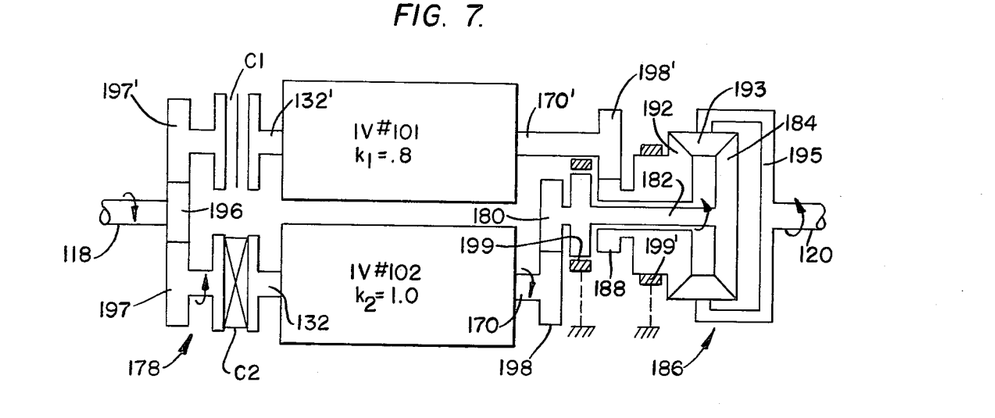
FIGS. 7-9 are schematic views depicting three modes of operation of an alternative embodiment of the present invention.
Figure 8:
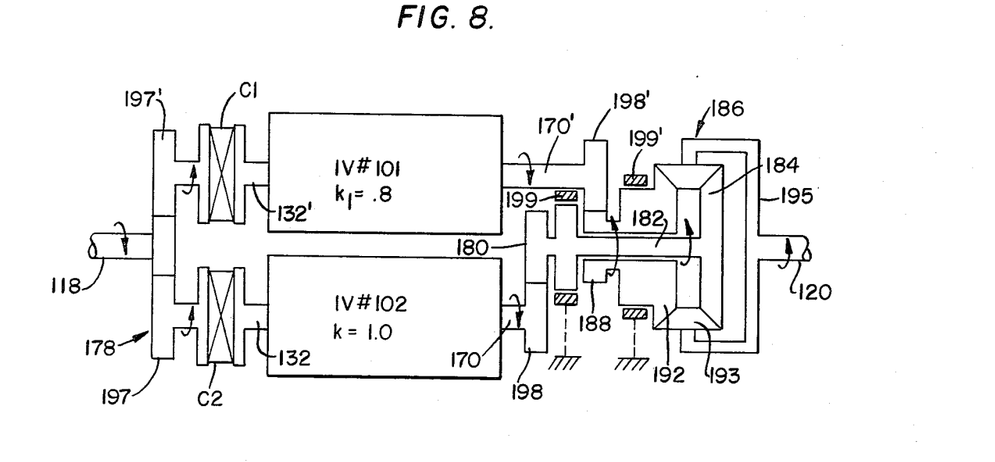
Figure 9:
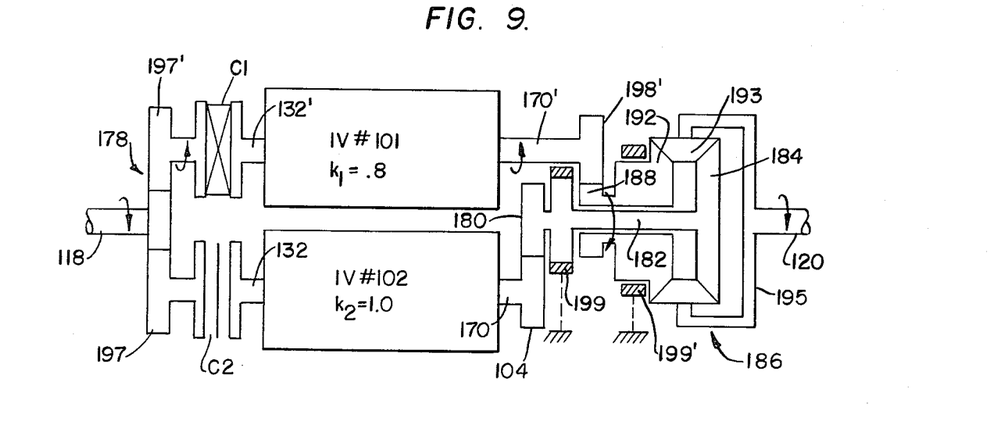

In FIGS. 7–10 of the drawings, an alternative embodiment of the invention is shown and in which the operating principles of the previous embodiments are retained in a system having speed ratio range including a directional reversal of input/output shaft rotation. In FIGS. 7–9, the I.V. transmission units are again illustrated in block diagram style with corresponding parts of each unit designated by reference numerals having the same tens and digit numbers but in a one hundred series.

Structural changes in the alternative embodiment include modification of the epicyclic gear train 186 to include as inputs from the units IV#1 and IV#2, bevel gears 192 and 184, respectively, of the same diameter. The gearing 186, therefore, is a differential gearing unit in which the function K is equal to one. Also, both input paths to the bevel gears may be retained against rotation by releasable brakes 199 and 199'. Although it is possible for both I.V. units to be adjusted to a neutral condition, the unit input shafts 132' and 132 for the I.V. units IV#101 and IV#102 are coupled to the input gearing by clutches C1 and C2, respectively, for purposes of better illustrating the respective operating modes depicted in FIGS. 7–9. Thus the clutches C1 and C2 are represented by an X when engaged and by a line when disengaged. Finally, and though not illustrated in FIGS. 7–9, the unit gearing for the two units IV#101 and IV#102 (the gears 72, 72', 74, 74' and 76, 76' in FIGS. 2, 3 and 3A) is selected to provide a reduction function k of less than one for IV#101, for example 0.8, and a reduction function k of approximately 1.0 for IV#102. In all other respects, the construction of the alternative embodiment is the same as the previously described embodiment.

In FIG. 7, the system is depicted for operation in an operational mode A1' and as such, the clutch C2 is engaged whereas the clutch C1 is disengaged. Also it will be noted that the brake 199' is engaged so that the differential bevel gear 192 will be blocked against rotation. The brake 199 is shown to be disengaged. As a result of this organization of components, the transmission unit IV#101 will be idle and all power at the input shaft 118 directed through the unit IV#102. Because the gear 192 in the differential gear 186 is locked against rotation, the output shaft 120 will be driven by rotation of the bevel gear 184 but at speeds one-half the speeds of the unit output shaft 170 due to the reduction gearing effected by the differential unit 186 in this mode of operation.

In FIG. 8, the system is depicted in an operational mode B'. In this mode, both I.V. transmission units are operative but independently regulated so that the combination of torque delivered by the outputs 170 and 170' respectively to the bevel gears 184 and 192 of the differential unit will result in the desired drive of the output shaft 120. In particular, both bevel gears 192 and 184 of the differential unit will be driven in the same direction and at varying common speeds depending on the speed of rotation desired in the system output shaft 20, In FIG. 9, the system is illustrated in a "reverse" mode of operation and as such, the clutch C1 is engaged, the clutch C2 disengaged, the brake 199 engaged and the brake 199' disengaged. Thus, only the transmission unit IV#101 is operative in this mode. Because the unit gearing function k in IV#101 is selected to be 0.8, for example, operation of the unit IV#101 in the reverse mode will be effected by adjusting the rings 50' and 52' (FIG. 2) to cause the output shaft 170' thereof to be driven in a direction the reverse of which it was driven in the forward modes of operation. Also, the gear reduction provided by the differential unit 86 in the modes of operation will be equally applicable to operation in the reverse mode as depicted in FIG. 9 of the drawings.

Assuming that the functions $p_1$ and $p_2$ represent the speed ratio variable for the respective units IV#101 and IV#102, these functions will be adjusted independently, as above-mentioned, by the controls 69 and 69'. As will be appreciated by those skilled in the art, given the program of operation described with reference to the described system embodiments, the controls 69 and 69' may be further governed by a single master control 108 as represented schematically in FIG. 1 of the drawings. Also the various clutches and brakes may be regulated by the master control unit if such clutches and brakes are used in the system. As mentioned, the clutches may be omitted if desired to rely on the adjustability of the I.V. units to attain no rotation in the unit output shafts regardless of the speeds at which the respective unit input shafts are driven.

Figure 10:
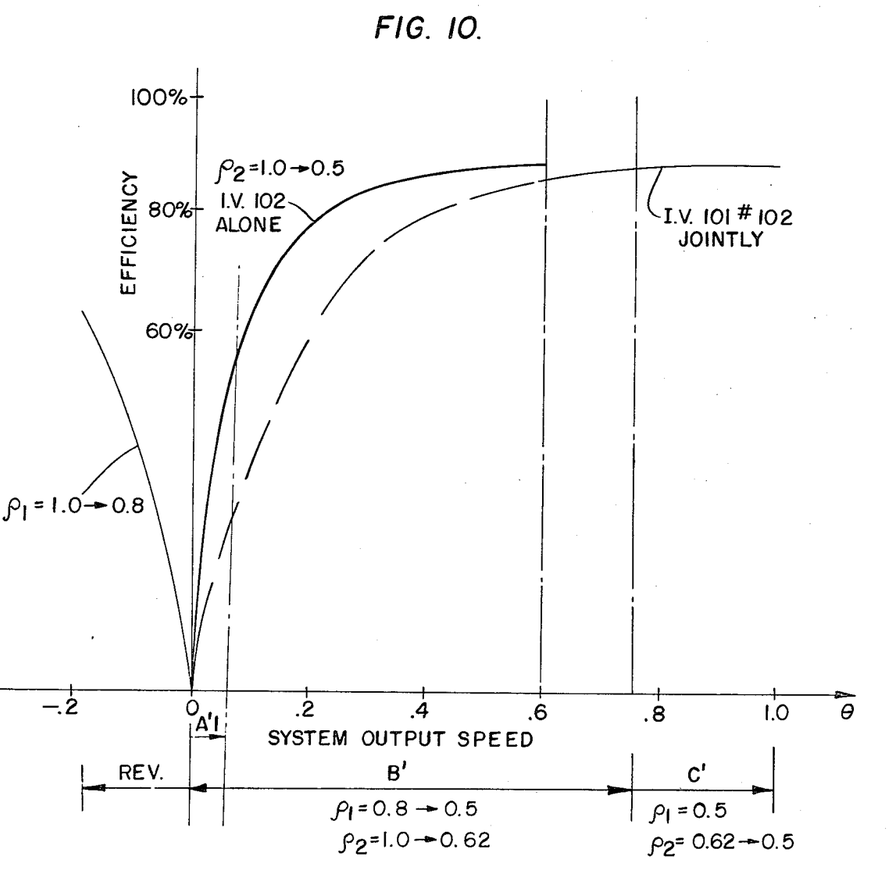
FIG. 10 is a graph illustrating transmission unit efficiency during operation of the embodiment of FIGS. 7-9.

Operation of the system embodiment represented by FIGS. 7–9 may be appreciated further by reference to FIG. 10 in which I.V. unit efficiency is plotted against system output speed. In the efficiency curves shown in FIG. 10, it is assumed that $k_1$ for the unit IV#101 is again approximately 0.8 as above-mentioned, that $k_2$ for the unit IV#102 is approximately 1.0 and that $p_1$ and $p_2$ for the respective units varies from a minimum value of 0.5 to a maximum value of 1.0. Thus in the reverse mode of operation, system output will be driven only by the unit IV#101 and $p_1$ adjusted from approximately 1 to 0.8. In the mode A1' where the unit IV#101 is idle, the system output shaft is driven by the unit IV#102 in which the function $p_2$ may be adjusted from 1.0 to a lower value. Because of the 2:1 gear reduction provided by the differential unit 186, torque loading on the unit IV#102 during this operation is reduced, thereby steepening the efficiency curve during this mode of operation.

The transition from mode A1' to mode B' operation is again selected to correlate system output power with the operating efficiencies of the I.V. units as in the previous embodiment. In mode B' operation, the function $p$ for each unit is adjusted to split system power equally between the I.V. units. Specifically, $p_1$ is adjusted between 0.8 and 0.5 while $p_2$ pis adjusted between 1.0 and 0.62, given the aforementioned system parameters. The physical result of mode B operation is that the sun and ring gears will rotate at substantially the same angular velocity with little or no rotation of the planets 93 on their respective axes. Thus the epicyclic gear train 86 operates as a direct coupling from the I.V. units to the system output shaft 20 with minimal gearing efficiency losses in mode B. Mode C' operation is the same as mode C operation of the embodiment of FIGS. 1–6.

Thus it will be seen that as a result of the present invention, a unique infinitely variable transmission system and method is provided by which the above-mentioned objects are completely fulfilled. It will be equally apparent that various modifications may be made in the embodiments disclosed herein without departure from the inventive concepts manifested by such embodiments. Accordingly, it is expressly intended that the foregoing description is illustrative of preferred embodiments only, not limiting, and that the true spirit and scope of the present invention be determined by reference to the appended claims.

I claim:

1. In a power transmission system having a system input, a system output and infinitely variable power transmitting means coupling said input and said output to drive said system output at a range of speeds variable in relation to the speed of said system input, said power transmitting means comprising:

first and second I.V. transmission units each having a unit input, a unit output and means for varying the output/input speed ratio infinitely between minimum and maximum values;

means coupling said unit inputs to said system input;

an epicyclic gear train having first and second gear inputs and a gear output;

means coupling said gear output to said system output;

means coupling said unit output of each of said first and second units to said first and second gear inputs, respectively; and means for independently controlling the speed ratio of each of said first and second units to divide substantially equally between said units, the power transmitted between said system input and system output over a major portion of the range of system output speeds.

2. The apparatus recited in claim 1 including means for releasably retaining one of said first and second gear inputs against rotation to transmit power from said system input through only the other of said gear inputs to drive said output in one mode through a gear reduction provided by said epicyclic gear train.

3. The apparatus recited in claim 2 wherein said first and second gear inputs are of equal radii thereby to provide in said one mode a gear reduction of 2:1.

4. The apparatus recited in either of claims 1, 2 or 3 wherein each of said I.V. transmission units comprises unit gearing for transmitting torque between said unit input and said unit output.

5. The apparatus recited in claim 4 wherein each of said I.V. transmission units includes means defining a gear reduction function (k) and a variable ratio function (ρ) and wherein unit output speed ($\overset{\circ}{\theta}$) is related to unit input speed ($\overset{\circ}{\alpha}$) by the equation:

$$\overset{\circ}{\theta} = \overset{\circ}{\alpha}\,(1 - k/\rho).$$

6. The apparatus recited in claim 5 wherein said unit gearing of at least one of said transmission units has a gear reduction function (k) of less than 1.

7. The apparatus recited in claim 6 wherein at least said one of said units having unit gearing with a reduction function (k) of less than 1 includes means for varying said function (ρ) between minimum and maximum values providing for rotation of said unit output of said one unit in opposite directions relative to said input thereof for at least certain values of said ratio function (ρ).

8. The apparatus recited in claim 2 wherein said first and second gear inputs are respectively the ring and sun gears of a planetary unit having a planet carrier, said gear output being coupled with said carrier.

9. The apparatus recited in claim 8 wherein each of said I.V. transmission units includes means defining a ratio function (ρ) continuously variable to adjust the output/input speed ratio of each unit between minimum and maximum values, wherein said releasable retaining means is operative with respect to said ring gear, and further comprising means for controlling said I.V. transmissions and said releasable retaining means to cause a first mode of system operation in which said speed ratio of said second I.V. transmission is varied from said minimum value while said first I.V. transmission is idle and said ring gear is braked against rotation, a second mode of operation in which said speed ratios for both of said I.V. transmissions are varied to drive said sun and ring gears at respective angular velocities selected to equally divide power transmitted through said I.V. transmission units, and a third mode of operation in which said speed ratio for said second I.V. transmission unit is retained at its maximum value while the speed ratio of said second I.V. transmission is varied from an intermediate value to said maximum value.

10. The method of transmitting power from the input to the output of a transmission system having parallel first and second infinitely variable transmission units each having a unit input and a unit output, and a control for independent adjustment of output/input speed ratios thereof, said method comprising the steps of:
transmitting power through both of said first and second units to drive the system output in one range of speeds;
regulating the speed ratio of each of said units so that the product of unit output torque and speed is the same for each of said units, thereby to divide power transmitted through the system in said one range substantially equally between said units;
reducing the gear ratio between the output of said first unit and said system output; and
transmitting power through said first unit only to drive said system output in another range of speeds.

11. The method recited in claim 10 including the step of regulating the speed ratio of one of said units while the output/input speed ratio of the other is maximum, thereby to provide a third range of system output speeds.

12. The method recited in either of claims 10 or 11 wherein the power transmitting efficiency of each of said units varies substantially as the reciprocal of torque and comprising the step of shifting between transmission of power through both said units in said one range of speeds and transmission of power through said first unit only in said other range of speeds when the average efficiency of both said units is approximately one-half the efficiency of said first unit in said other range of speeds.

* * * * *